(12) United States Patent
Ngo

(10) Patent No.: US 6,215,607 B1
(45) Date of Patent: Apr. 10, 2001

(54) WRITE DRIVER USING CONTINUOUS DAMPING NETWORK TO REDUCE OVERSHOOT, UNDERSHOOT AND SETTLING TIME FOR MAGNETIC INDUCTIVE RECORDING HEAD

(75) Inventor: Tuan V. Ngo, Eden Prairie, MN (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/867,096

(22) Filed: Jun. 2, 1997

Related U.S. Application Data

(60) Provisional application No. 60/019,718, filed on Jun. 13, 1996.

(51) Int. Cl.[7] .................................................. G11B 5/09
(52) U.S. Cl. ............................ 360/46; 360/68; 327/538; 327/310
(58) Field of Search .................................. 360/68, 67, 46, 360/66, 61, 55, 31; 327/423, 540, 538, 545, 374, 375, 323, 317, 310, 309, 110, 108

(56) References Cited

U.S. PATENT DOCUMENTS

| | | |
|---|---|---|
| 5,282,094 * | 1/1994 | Ngo . |
| 5,287,231 * | 2/1994 | Shier et al. . |
| 5,296,975 * | 3/1994 | Contreras ................................ 360/46 |
| 5,386,328 * | 1/1995 | Chiou et al. . |
| 5,392,172 * | 2/1995 | Yoshinaga et al. ..................... 360/67 |
| 5,532,631 * | 7/1996 | Ngo et al. . |
| 5,534,818 * | 7/1996 | Peterson . |
| 5,638,612 * | 6/1997 | Hashimoto et al. .................... 360/68 |
| 5,739,706 * | 4/1998 | Okamoto ............................ 360/46 X |

OTHER PUBLICATIONS

"Read/Write Amplifier Design COnsiderations for MR Heads" by K.B. Klaasen et al. *IEEE Transactions on Magnetics*, vol. 31, No. 2, Mar. 1995.*

"A Resonant Switching Write Driver for Magnetic Recording"0 by R. J. Reay et al, *IEEE Journal of Solid–State Circuits*, vol. 32, No. 2, Feb. 1997.*

"A Low–Power 3V–5.5V Read/Write Preamplifier for Rigid–Disk Drives" by T. Ngo et al, *ISSCC94/Session 17/Disk–Drive Electronics/Paper FA 17.6. 1994 IEEE International Solid–State Circuit Conference.*

* cited by examiner

*Primary Examiner*—Alan Faber
(74) *Attorney, Agent, or Firm*—Kinney & Lange, P.A.

(57) ABSTRACT

A write driver circuit for selectively controlling a direction of write current flow through a magnetic head having an inductive coil includes a source of first and second write currents. A forward drive switch directly sinks the first write current and sinks the second write current through the coil in a first direction. A reverse drive switch directly sinks the second write current and sinks the first write current through the coil in a second direction opposite the first direction. A control circuit operates the forward and reverse drive switches so that write current flows through the coil in a selected direction. An overshoot reduction circuit may be provided to reduce write current overshoot through the coil. An active subcircuit generates a compensation signal based on a voltage across the head exceeding a predetermined threshold. The first and second write currents are adjusted in response to the active subcircuit based on the compensation signal.

18 Claims, 4 Drawing Sheets

WRITE DRIVER USING CONTINUOUS DAMPING NETWORK TO REDUCE OVERSHOOT, UNDERSHOOT AND SETTLING TIME FOR MAGNETIC INDUCTIVE RECORDING HEAD

CROSS-REFERENCE TO RELATED APPLICATIONS

This application claims priority from Provisional Application Ser. No. 60/019,718 filed Jun. 13, 1996 for "Write Driver With Overshoot Reduction Circuitry For Magnetic Inductive Transducer" by T. Ngo.

BACKGROUND OF THE INVENTION

The present invention relates to a magnetic head read/write preamplifier within a magnetic storage system, and particularly to a write driver circuit within the read/write preamplifier having improved switching speed, improved rise/fall time, reduced write current ringing, and reduced asymmetry.

In magnetic data storage systems, a magnetic read/write head is operable to write binary data, representing ones and zeros, onto a magnetic medium such as a magnetic tape or disc. The head uses an inductive coil to generate magnetic fields, which form magnetic patterns on the medium representing the ones and zeros. The orientation of the patterns depends on the direction of electrical current flow through the inductive coil, so that writing the binary data entails selectively changing, or reversing, the direction of current flow through the head. Changing the direction of current flow through the coil is the function of a write driver.

The write driver includes a drive circuit, coupled to the head, and a control circuit for operating the drive circuit in response to control data signals. Conventionally, the drive circuit is configured as an H-switch, which has a pair of forward switches and a pair of reverse switches. (The term H-switch stems from the H-shaped arrangement of the four switches and the head in electrical schematics.) The control circuit is conventionally responsive to a pair of complementary, or differential, control data signals to selectively open and close the forward and reverse switches of the H-switch, thereby changing the direction of current through the head to write a specific bit pattern on the magnetic medium.

The major components of the write driver are usually formed from transistors, which serve as switches. For example, FIG. 1 shows a typical write driver 10 coupled to a head 11 that includes an inductive coil $L_H$. Write driver 10 includes an H-switch drive circuit 12 and a differential control circuit 14. The H-switch drive circuit, connected between opposite supply terminals such as $V_{CC}$ and ground, includes four drive transistors Q1–Q4, two head terminals 16 and 18, and a write current source $I_W$. Transistors Q1 and Q4 serve as forward switches, and transistors Q2 and Q3 serve as reverse switches.

Differential control circuit 14 comprises control transistors Q5 and Q6, pull-up resistors R1 and R2, and pre-driver control current source $I_D$, and operates the forward and reverse switches Q1–Q4 in response to write control signals at write control inputs $V_X$ and $V_Y$. Specifically, when input $V_Y$ is a higher voltage than input $V_X$, control circuit 14 closes, or turns on, control transistor switch Q5, and opens, or turns off, control transistor switch Q6. This arrangement turns on the forward switches Q2 and Q3 and turns off the reverse switches Q1 and Q4. As a result, current $I_W$ flows from $V_{CC}$ through switch Q2, head 11 from terminal 18 to terminal 16, and switch Q3 into the ground of the circuit. Conversely, when input $V_X$ is at a higher voltage than input $V_Y$, control circuit 14 turns on control transistor switch Q5 and turns off control transistor switch Q6, thereby turning on the reverse switches and turning off the forward switches. This directs write current $I_W$ through switch Q1, head 11 from terminal 16 to terminal 18, and switch Q4 into the ground of the circuit. Thus, changing the relative voltage levels at inputs $V_X$ and $V_Y$ changes the direction of write current flow through head 11.

In practice, the write driver of FIG. 1 suffers from two problems. First, its constituent transistors have inherent switching speed limitations which inhibit the write driver and head from writing data as quickly and as densely as is necessary in high performance data storage systems. Second, the current flowing through the head immediately following a change in the direction of current flow tends to "overshoot" the desired value of write current, resulting in an additional delay for the write current to settle at its desired value after a transition.

The transistors forming the write driver suffer from switching limitations. Unlike ideal switches, transistors have inherent structural, or parasitic, capacitances which prevent them from instantaneously opening (turning off) or closing (turning on). These capacitances charge or discharge while opening or closing the transistor switch, and thus slow or delay the opening and closing of the transistor switch. The delays in opening and closing not only limit how fast bits are written but ultimately how closely the bits are spaced on a magnetic medium. The closeness of the bits, which is known as bit density, is a factor in the data capacity of a magnetic medium.

One particular aspect of this switching limitation or problem concerns transistors Q1–Q4, the four drive transistors of the H-switch drive circuit. These transistors have a larger surface area than control circuit transistors Q5 and Q6, enabling them to conduct the relatively large write current necessary for operating the write head. Larger transistors generally have larger inherent capacitances, which require more time to charge and discharge than do smaller capacitances. Thus, within the write driver, the four H-switch drive transistors Q1–Q4 are a significant factor limiting switching speed and bit density.

To alleviate the switching limitations of the H-switch drive transistor, artisans have sought to increase the capacity of control circuit 14 to rapidly charge and discharge the larger inherent capacitances of these transistors and thereby reduce their turn-on and turn-off times. There are several known approaches for increasing the current charging the drive transistors and thereby reducing their turn-on times.

One approach entails increasing current flow through resistors R1 and R2, known as pull-up resistors. Unfortunately, increasing the current flow through resistors R1 and R2 also reduces the voltage change across the write head, known as head swing, which in turn reduces switching speed. Head swing determines the rate of change of current in the write head, which in turn determines how fast current in the write head itself can actually start, stop, and reverse direction in writing individual data bits. Reducing head swing therefore reduces switching speed. This approach is especially inadequate in low-voltage applications where any reduction in head swing significantly reduces switching speed.

A second approach entails connecting separate NPN emitter-follower circuits between the respective pull-up resistors R1 and R2 and the respective bases, or control nodes, of drive transistors Q1 and Q2. More particularly, an NPN emitter-follower includes an NPN transistor with its base connected to pull-up resistor R1, its collector coupled to the positive voltage supply terminal $V_{CC}$, and its emitter coupled to the base of transistor Q1 and to the ground terminal through a pull-down resistor. When activated, the NPN transistor drives an emitter current into the base of upper drive transistor Q1 that rapidly charges the capacitance of transistor Q1 and thus accelerates its turn-on. When deactivated, the NPN transistor allows the capacitance of upper drive transistor Q1 to passively discharge through the pull-down resistor to the ground terminal. The counterpart emitter-follower between resistor R2 and the control node of upper drive transistor Q2 operates similarly. Unlike the first approach of increasing current flow in the pull-up resistors, the NPN emitter-follower circuits improve the turn-on times of the upper drive transistors without diminishing head-swing. However, this approach is also inadequate because it improves only the turn-on times, and not the turn-off times of the upper drive transistors.

A third approach entails connecting separate PNP pull-down transistor circuits between the respective control nodes of transistors Q3 and Q4 and the ground terminal of the circuit. A write driver incorporating this technique is described in U.S. Pat. No. 5,532,631 (Ngo et al.), which is hereby incorporated by reference herein. This technique alternately supplies base current to the switching drive transistors to charge their parasitic capacitances and sinks base current from the switching drive transistors to discharge their parasitic capacitances.

A technique for improving both the turn-on and the turn-off times of the drive switching transistors entails charging and discharging their capacitances using respective MOSFET (metal-oxide-semiconductor field effect transistor) inverters. A write driver incorporating this technique is shown in U.S. Pat. No. 5,296,975 (Contreras). Contreras, however, uses both bipolar junction transistors and MOSFETs which makes it more complicated to manufacture than a pure bipolar or MOS design. Thus, even though the Contreras write driver includes MOS inverters for charging and discharging the capacitances of its upper drive transistors, its complexity and manufacture are significant drawbacks.

In addition to the inherent switching limitation of the drive transistors, the write driver of FIG. 1 also suffers from the second problem of the write current "overshooting" the desired value immediately following a change in current flow direction through the head. Specifically, during the starting and stopping and reversing of write current direction, the inductive coil in the write head inequitably exhibits a phenomenon, known as self-inductance, which produces A transient voltage, that is, a voltage spike, across the write head. The voltage spike, commonly called kickback, typically produces a ringing, or oscillating, voltage that lasts several nanoseconds before decaying to a negligible magnitude. These voltage spikes cause excessive write current to flow through the head following a reversal in the direction of current flow, to overcome the inductive coil's resistance to the current direction change. As a result, the write current exceeds its desired value and an additional delay time, known as settling time, is required for the oscillating write current to settle to the desired value. The additional delay slows total transition time and thereby inhibits the density of bit recording on the magnetic medium, which is desirably as high as possible.

One known solution to the ringing problem has been to connect a damping resistor across the terminals of the write head. The resistive damping reduces the settling time for the write current flowing through the head. However, resistive damping has several negative effects on the performance of the write circuit. Since some of the write current is diverted through the damping resistor, write current through the head is reduced. To achieve the desired value of write current through the head, more current must be generated to flow through both the head and the damping resistor. More importantly, the damping resistor slows the rise/fall times for write current transitions. This can adversely affect bit density. While resistive damping generally does reduce settling time, the slower rise/fall times may not be acceptable for high performance write circuits.

Accordingly, there is a need for a write driver having a simple control circuit that improves the turn-on and turn-off times of the drive transistors without diminishing head swing and reduces write current overshoot through the head and settling time without adversely affecting the rise/fall time of the write current.

SUMMARY OF THE INVENTION

The present invention is a write driver circuit for selectively controlling a direction of write current flow through a magnetic head having an inductive coil. The circuit includes first and second write current sources. A forward drive switch directly sinks the first write current and sinks the second write current through the coil in a first direction. A reverse drive switch directly sinks the second write current and sinks the first write current through the coil in a second direction opposite the first direction. A control circuit operates the forward and reverse drive switches so that write current flows through the coil in a selected one of the first and second directions.

One aspect of the invention is an overshoot reduction circuit for reducing write current overshoot through the coil following a change in the direction of write current flow through the coil. An active subcircuit generates a compensation signal based on a voltage across the magnetic head that exceeds a predetermined threshold. In response to the active subcircuit, the write current is adjusted based on the compensation signal.

Another aspect of the present invention is a method of reducing write current overshoot through the coil following a change in the direction of write current flow through the coil. A compensation signal is generated based on a voltage across the magnetic head that exceeds a predetermined threshold. The write current is adjusted based on the compensation signal.

DETAITED DESCRIPTION OF THE PREFERRED EMBODIMENTS

Figure 2:
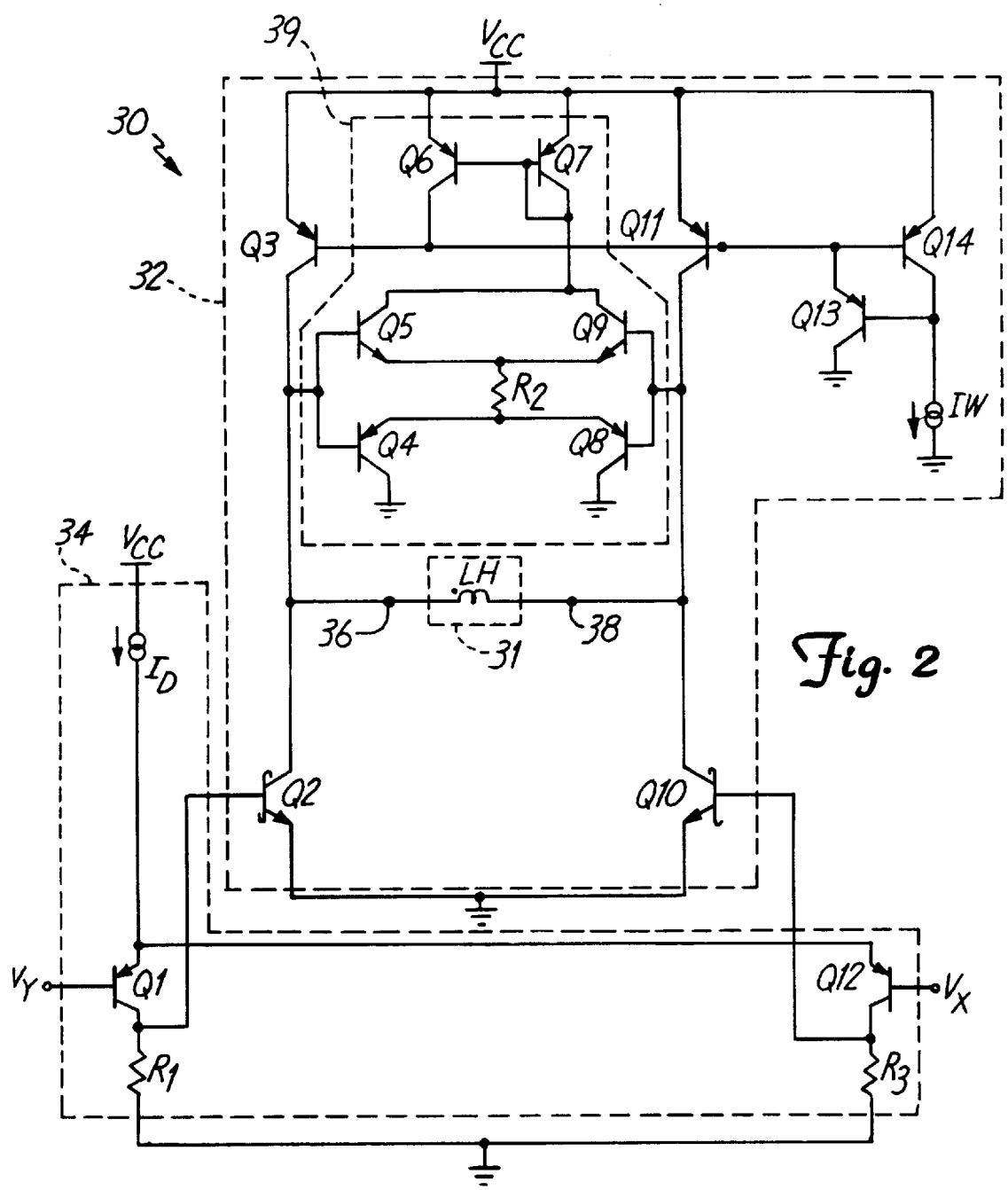
FIG. 2 is a schematic illustration of a write driver circuit according to the present invention.

FIG. 2 is a schematic illustration of a write driver circuit 30 according to the present invention. Write driver circuit 30 includes drive circuit 32 coupled to head 31 at contacts 36 and 38, and differential control circuit 34. Drive circuit 32 includes overshoot reduction circuit 39. Drive circuit 32, connected between opposite supply contacts such as $V_{CC}$ and ground, includes two switching NPN Schottky drive transistors Q2 and Q10, write current source 40, and PNP transistors Q3, Q11, Q13 and Q14 configured as a current mirror to provide write current $I_W$ through transistors Q3 and Q11. Drive transistor Q10 serves as a forward switch, and drive transistor Q2 serves as a reverse switch.

Write current $I_W$ is mirrored through transistors Q13 and Q14 continually provided through transistors Q3 and Q11. Write current $I_W$ is diverted through the inductive coil $L_H$ of head 31 by selectively controlling the states of drive transistors Q2 and Q10. When transistor Q2 is conducting and transistor Q10 is off, write current $I_W$ is diverted through inductive coil $L_H$, from contact 38 to contact 36, and a current equal to $2*I_W$ is sunk by transistor Q2. Conversely, when transistor Q10 is conducting and transistor Q2 is off, write current $I_W$ is diverted through inductive coil $L_H$ of head 31 from contact 36 to contact 38, and a current equal to $2*I_W$ is sunk by transistor Q5. By continually providing write current through transistors Q3 and Q11 and selectively diverting the write current through head 31 by alternately operating drive transistors Q2 and Q10 as current sinks, drive circuit 32 is implemented with only lower switching drive transistors, eliminating the upper switching drive transistors present in conventional H-switch drive circuits. Thus, the switching limitations inherent in upper switching drive transistors are eliminated, improving the overall switching time of the system. Also, since only one forward switch and one reverse switch are used, problems of asymmetry due to imperfect synchronization of switching multiple forward and reverse switches are eliminated.

Differential control circuit 34 includes PNP control transistors Q1 and Q12, pull-down resistors R1 and R3, and pre-driver current source $I_D$. Write control signal $V_Y$ is applied at the base control region of transistor Q1. Write control signal $V_X$ is applied at the base of transistor Q12. The emitter of transistor Q1 is coupled to the emitter of transistor Q12. Pre-driver control current source $I_D$ is coupled between the positive supply contact $V_{CC}$ and the emitters of transistors Q1 and Q12. The collector of transistor Q1 is connected through resistor R1 to ground, and also is coupled to the base of drive transistor Q2. The collector of transistor Q12 is coupled through resistor R3 to ground, and also is coupled to the base of drive transistor Q10.

Control circuit 34 operates the forward and reverse switches Q10 and Q2 in response to the write control signals at inputs $V_X$ and $V_Y$. For example, when input $V_Y$ is at a lower voltage than input $V_X$, control circuit 34 turns on control transistor switch Q1, and turns off control transistor switch Q12. As a result, drive transistor Q2 conducts, or is turned on, and drive transistor Q10 does not conduct, or is turned off. Thus, in this state, write current $I_W$ flowing through transistor Q3 flows directly through transistor Q2 to ground, and write current $I_W$ flowing through transistor Q11 is diverted through head 31 from terminal 38 to terminal 36, through transistor Q2 to ground. Conversely, when input $V_X$ is at a lower voltage than input $V_Y$, control circuit 34 turns on control transistor switch Q12 and turns off control transistor switch Q1, thereby turning on drive transistor Q10 and turning off drive transistor Q2. This directs write current $I_W$ flowing through transistor Q11 directly through transistor Q10 to ground, and diverts write current $I_W$ flowing through transistor Q3 through head 31 from terminal 36 to terminal 38, through transistor Q10 to ground. Thus, changing the relative voltage levels at inputs $V_X$ and $V_Y$ changes the direction of write current flow through head 31.

Overshoot reduction circuit 39 includes NPN transistors Q5 and Q9, PNP transistors Q4, Q8, Q6 and Q7, and resistor R2. The bases of transistors (Q4 and Q5 are coupled to contact 36, and the bases of transistors Q8 and Q9 are coupled to contacts 38. The emitter of transistor Q4 is coupled to the emitter of transistor Q8. The emitter of transistor Q5 is coupled to the emitter of transistor Q9. Resistor R2 is coupled between the emitters of transistors Q4 and Q8 and the emitters of transistors Q5 and Q9. The collectors of transistors Q4 and Q8 are coupled to ground. The collector of transistor Q5 is coupled to the collector of transistor Q9, and also to the collector of transistor Q7, The collector of transistor Q7 is coupled to the base of transistor Q7, which is in turn coupled to the base of transistor Q6. The emitters of transistors Q6 and Q7 are coupled to the positive supply contact $V_{CC}$. The collector of transistor Q6 is coupled to the bases of transistors Q3, Q11 and Q14.

In an initial state of operation, control input $V_Y$ is in a high voltage state, and control input $V_X$ is in a low voltage state, for example. Thus, control transistor Q1 is not conducting, or off, and control transistor Q12 is conducting, or on. Pre-driver current $I_D$ flows through transistor Q12, through resistor R3 to ground, and into the base of drive transistor Q10. Thus, transistor Q10 conducts, or is turned on. Because control input $V_Y$ is high, and control transistor Q1 is off, no current flows through transistor Q1, through resistor R1, or into the base of drive transistor Q2. Thus, transistor Q2 does not conduct, or is turned off.

Write current $I_W$ is mirrored through transistors Q3 and Q11. Since drive transistor Q10 is conducting and drive transistor Q2 is not conducting, write current $I_W$ through transistor Q11 is pulled directly through transistor Q10, and write current $I_W$ through transistor Q3 is diverted through head 31 from contact 36 to contact 38 and through transistor Q10 to the ground contact of the circuit, so that a total current of $2*I_W$ is sunk by transistor Q10.

In order to reverse the direction of write current flow through the inductive coil $L_H$ of head 31, control input $V_Y$ is switched from a high voltage level to a low voltage level, and control input VX is switched from a low voltage level to a high voltage level. These switches in voltage levels turn control transistor Q1 on, and turn control transistor Q12 off.

Pre-driver current $I_D$ flows through transistor Q1, through resistor R1 to ground, and into the base of drive transistor Q2. Thus, transistor Q2 conducts, or is turned on. Because control input $V_X$ is high, and control transistor Q12 is off, no current flows through transistor Q12, through resistor R3, or into the base of drive transistor Q10. Thus, transistor Q10 does not conduct, or is turned off.

In the initial state of operation described above, before switching inputs $V_X$ and $V_Y$, the voltage between contacts 36 and 38 across head 31 was quite small, since the write current through the inductive coil $L_H$ was constant, and the voltage across the head is governed by $$V = L\, dI/dt$$

where V is the voltage across head 31, L is the inductance of coil $L_H$, and I is the current flowing through head 31. In practice, inductive coil $L_H$ of head 31 has a small resistance associated with it, so that the voltage across head 31 is equal to $I_W*R_{head}$ when the write current is constant through head 31, but the resistance of inductive coil $L_H$ is typically small enough that this voltage is negligible.

Immediately after switching the write control input $V_Y$ and $V_X$, the rate of change of current (dI/dt) increases, thereby increasing the voltage between contacts 36 and 38 across head 31 in the form of a voltage spike. In the absence of overshoot reduction circuitry 39, the write current flowing through head 31 between contacts 36 and 38 would "overshoot" its desired value, and an additional settling time would be required for the write current to return to its desired value.

With the present invention, however, when the voltage across head 31 reaches two diode junction drops (where a diode junction drop, hereinafter "D", is approximately 0.7 V), overshoot reduction circuitry 39 is activated. Specifically, when the voltage at contact 38 exceeds the voltage at contact 36 by more than 2*D, transistors Q4 and Q9 of overshoot reduction circuit 39 are turned on. Transistors Q5 and Q8 remain off. Thus, a compensating current is generated through resistor R2, such that $$I_{comp} = \frac{(V_{diff} - D + V_{36}) - (D + V_{36})}{R2} = \frac{V_{diff} - 2D}{R2}$$

where $V_{diff}$ is the difference between the voltage at contact 38 and the voltage at contact 36, $V_{36}$ is the voltage at contact 36, and D is the base-emitter diode drop for each of transistors Q4 and Q9.

The compensation current $I_{comp}$ flows through transistor Q9, resistor R2, and transistor Q4 to ground. This compensation current is mirrored by transistors Q6 and Q7 to subtract from the currents flowing out of the bases of transistors Q3, Q11 and Q14. Thus, when the compensating current is produced by overshoot reduction circuit 39, the write current flowing through transistors Q3 and Q11 is reduced. This reduction in write current supplied by drive circuit 32 occurs when the voltage swing across head 31 would ordinarily cause the write current through inductive coil $L_H$ to overshoot its desired value. Thus, the write current drawn through inductive coil $L_H$ of head 31 does not overshoot its desired value by as much as it would otherwise, due to the write current reduction achieved by overshoot reduction circuit 39 during a voltage spike across head 31. Write current overshoot and settling time during write current ringing are thereby reduced.

Figure 1:
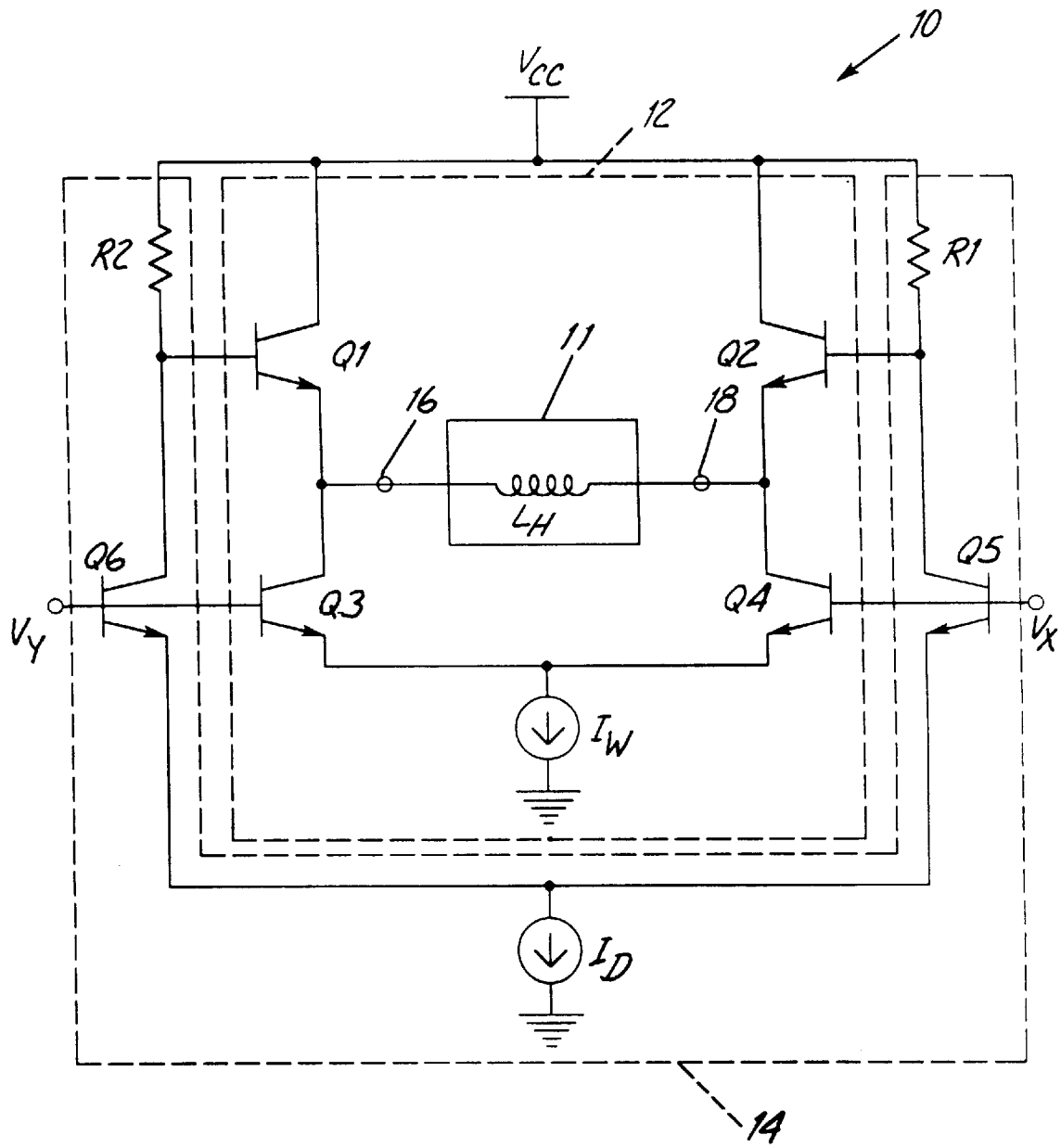
FIG. 1 is a schematic illustration of a conventional H-switch write driver circuit.
Figure 3:
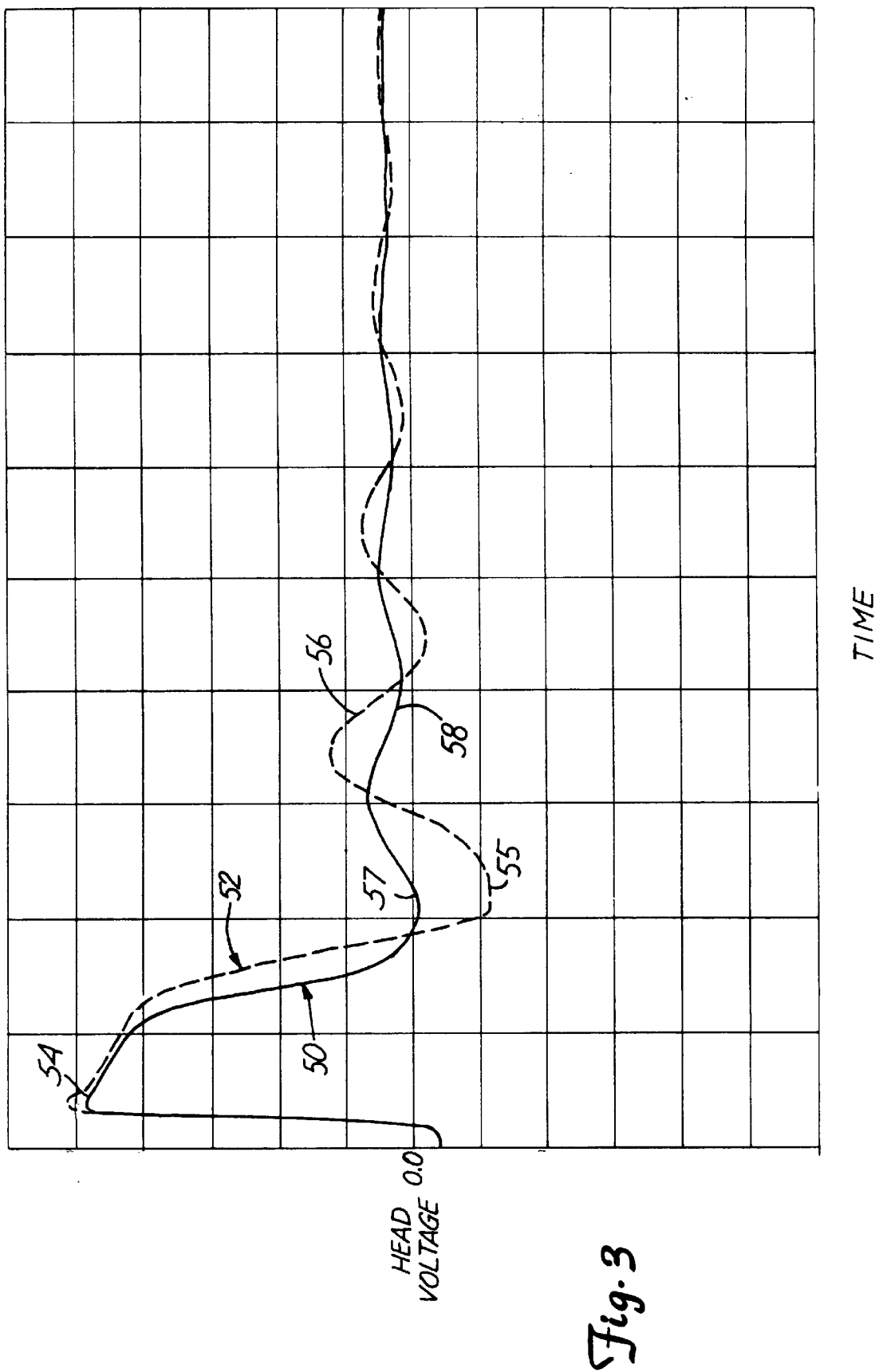
FIG. 3 is a graph comparing the voltage across the write head provided by the write driver circuit of the present invention to that provided by prior art write drivers.
Figure 4:
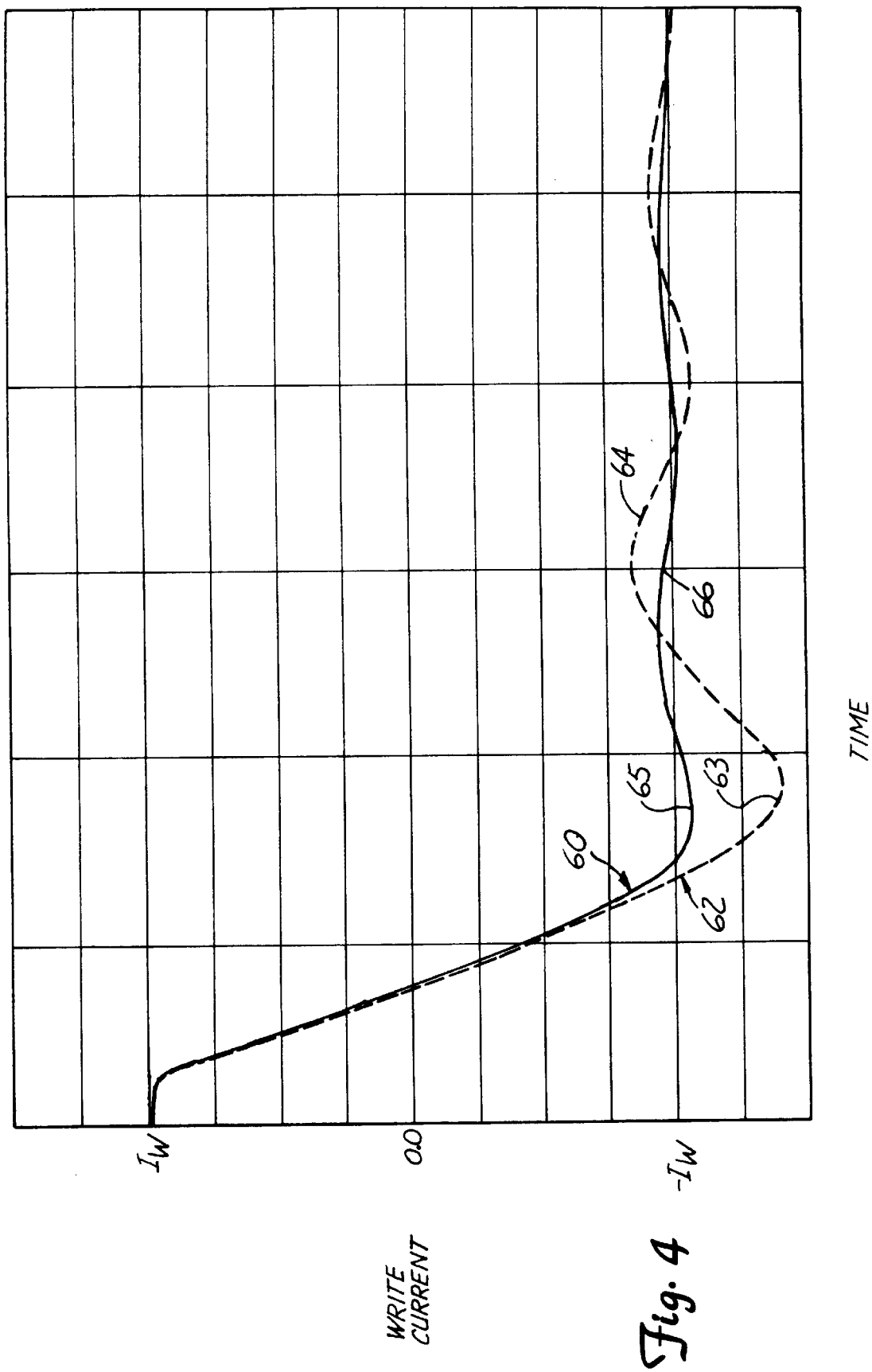
FIG. 4 is a graph comparing the write current through the write head provided by the write driver circuit of the present invention to that provided by prior art write drivers.

FIG. 3 is a graph showing the voltage across the write head, and FIG. 4 is a graph showing the write current through the head, for the write driver of the present invention (lines 50 and 60) and for a conventional write driver such as shown in FIG. 1 (lines 52 and 62).

As shown in FIG. 3, during a transition in write current direction, the voltage across the write head increases rapidly to a level approaching or even exceeding the supply rails of the write driver, and then returns to a relatively low level after the write current direction change has occurred. In returning to the low level, the voltage across the head in prior circuits (without overshoot reduction circuitry) typically overshoots its final value, as shown at 55, and then experiences significant ringing as it settles to its final value, as shown at 56. Line 52 thus represents a head voltage characteristic for the write driver shown in FIG. 1, which exhibits substantial overshoot and requires a relatively long settling time to resolve to its final value. Line 50 represents a head voltage characteristic for a write driver implementing overshoot reduction circuitry 39, as shown in FIG. 2, according to the present invention. In returning to the low voltage level, the write current is reduced, thereby diminishing overshoot, as shown at 57, and ringing, as shown at 58. As a result, the head voltage characteristic exhibits much less overshoot and requires less settling time, without reducing the overall head voltage swing associated with the write driver.

As shown in FIG. 4, the write current 62 through the head in prior write drivers typically experiences effects similar to the head voltage waveform during a transition in write current direction. Assuming a 40 volt peak-to-peak write current signal, a positive supply rail of +5 volts, head inductance of 0.6 microHenrys and head resistance of 20 Ohms, a typical write driver (such as the one shown in FIG. 1) exhibits 21% overshoot, shown at 63, with a rise/fall time of 4.14 nanoseconds, and requires several nanoseconds to reduce ringing effects, shown at 64, even below 5%. By contrast, the write current 60 through head 31 in the write driver of FIG. 2 implementing overshoot reduction circuitry 39 according to the present invention exhibits only 3% overshoot, shown at 65, with significantly less ringing effects, shown at 66, and has a rise/fall time of 4.27 nanoseconds, nearly identical to the rise/fall time experienced in typical write drivers.

The present invention therefore reduces write current overshoot and settling time without affecting rise/fall time or head voltage swing. Switching limes are improved due to the elimination of upper switching drive transistors, and problems of asymmetry are reduced due to the deployment of single forward and reverse switches.

It is to be understood that the transistor polarities shown to describe the present invention are illustrative only; various combinations of transistor polarities and types may be used to realize the present invention. Various supply levels are likewise contemplated by the present invention.

The current mirror circuit provided by transistors Q3, Q11, Q13 and Q14 to provide dual write current paths is an exemplary embodiment of the invention. Many alternative configurations to provide dual write current paths are possible, arranged to be selectively adjusted by overshoot reduction circuit 39.

Although the present invention has been described with reference to preferred embodiments, workers skilled in the art will recognize that changes may be made in form and detail without departing from the spirit and scope of the invention.

What is claimed is:

1. A, write driver circuit for selectively controlling a direction of write current flow through a magnetic head having an inductive coil, comprising:

means for continually providing a first write current at a first end of the head and for continually providing a second write current at a second end of the head;

forward drive means operatively connected to the first end of the head For sinking the first write current and for sinking, the second write current through the coil in a first direction;

reverse drive means operatively connected to the second end of the head for sinking the second write current and for sinking the first write current through the coil in a second direction opposite the first direction; and control means for controlling the forward and reverse drive means to sink both the first and second write currents so that one of the first and second write currents flows through the coil in a selected one of the first and second directions.

2. The write driver circuit of claim 1, including an overshoot reduction circuit for reducing write current overshoot through the coil comprising:

an active subcircuit generating a compensation signal based on a voltage across the magnetic head that exceeds a predetermined threshold; and means coupled to the means for continually providing first and second write currents and responsive to the active subcircuit to adjust the first and second write currents based on the compensation signal.

3. The write driver circuit of claim 2, wherein the active subcircuit of the overshoot reduction circuit comprises:
first and second complementary transistors each having a control region for coupling to a first side of the magnetic head;
third and fourth complementary transistors each having a control region coupled to a second side of the magnetic head; and
a resistor having a first side connected to the first and third transistors and having a second side connected to the second and fourth transistors.

4. The write driver circuit of claim 1, wherein the means for continually providing first and second write currents comprises:
a current source providing write current; and
a current mirror for continually mirroring the write current as first and second write currents.

5. The write driver circuit of claim 1, wherein:
the forward drive means comprises a forward switch for coupling to a first side of the magnetic head and connected to received the first write current, the forward switch being responsive to the control means to directly sink the first write current and to sink the second write current through the coil; and
the reverse drive means comprises a reverse switch for coupling to a second side of the magnetic head and connected to receive the second write current, the reverse switch being responsive to the control means to directly sink the second write current and to sink the first write current through the coil.

6. The write driver circuit of claim 5, wherein the forward switch comprises a first transistor having a control region coupled to the control means, a collector for coupling to the first side of the magnetic head, and an emitter connected to a ground potential, and wherein the reverse switch comprises a second transistor having a control region coupled to the control means, a collector for coupling to the second side of the magnetic head, and an emitter connected to the ground potential.

7. The write driver circuit of claim 6, wherein the means for continually providing first and second write currents comprises:
a current source providing write current; and
a current mirror connected to the collectors of the first and second transistors for continually mirroring the write current as first and second write currents.

8. The write driver circuit of claim 6, wherein the control means comprises:
a pre-driver current source having first and second sides, the first side being coupled to a predetermined potential;
first and second control inputs;
a first control transistor having a control region coupled to the first control input, a collector coupled to the control region of the first transistor, and an emitter coupled to the second side of the pre-driver current source;
a second control transistor having a control region coupled to the second control input, a collector coupled to the control region of the second transistor, and an emitter coupled to the second side of the pre-driver current source;
a first resistor coupled between the collector of the first control transistor and the ground potential; and a second resistor coupled between the collector of the second control transistor and the ground potential.

9. The write driver circuit of claim 6, including an overshoot reduction circuit for reducing write current overshoot through the coil comprising:
an active subcircuit generating a compensation signal based on a voltage across the magnetic head that exceeds a predetermined threshold; and
means coupled to the means for continually providing first and second write currents and responsive to the active subcircuit to adjust the first and second write currents based on the compensation signal.

10. The write driver circuit of claim 9, wherein the active subcircuit of the overshoot reduction circuit comprises:
third and fourth complementary transistors each having a control region for coupling to a first side of the magnetic head;
fifth and sixth complementary transistors each having a control region coupled to a second side of the magnetic head; and
a resistor having a first side connected to the third and fifth transistors and having a second side connected to the fourth and sixth transistors.

11. A write driver for providing write current and selectively controlling a direction of write current flow through a magnetic head having an inductive coil, comprising:
a write current source for providing a write current;
a drive circuit for connection to the write current source and the magnetic head to supply the write current through the coil; and
an overshoot reduction circuit for reducing write current overshoot through the coil following a change in the direction of write current flow through the coil the overshoot reduction circuit comprising:
an active subcircuit generating a compensation signal based on a voltage across the magnetic head that exceeds a predetermined threshold; and
means coupled to the write current source and responsive to the active subcircuit to adjust the write current provided by the write current source based on the compensation signal.

12. The circuit of claim 11, wherein the active subcircuit comprises:
first and second complementary transistors each having a control region for coupling to a first side of the magnetic head;
third and fourth complementary transistors each having a control region coupled to a second side of the magnetic head; and
a resistor having a first side connected to the first and third transistors and having a second side connected to the second and fourth transistors.

13. In a write driver for providing a write current and selectively controlling a direction of write current flow through a magnetic head having an inductive coil, a method of reducing write current overshoot through the coil following a change in the direction of write current flow through the coil, comprising:
generating a compensation signal based on a voltage across the magnetic head that exceeds a predetermined threshold; and
adjusting the write current provided based on the compensation signal.

14. A write driver circuit for selectively controlling a direction of write current flow through a magnetic head having an inductive coil, comprising:

a source for supplying a reference potential;

a current mirror connected to a first end and a second end of the head, the current mirror being operatively associated with the source for supplying the reference potential to continually provide a first write current at the first end of the head and to continually provide a second write current at the second end of the head, the first and second write currents flowing in the same direction with respect to the source for supplying the reference potential;

a forward drive switch operatively connected between the voltage source and the first end of the head to establish a first current path between the voltage source and the first end of the head for the first and second write currents;

reverse drive switch operatively connected between the voltage source and the second end of the head to establish a second current path between the voltage source and the second end of the head for the first and second write currents; and control circuitry operatively connected to the forward and reverse drive switches to selectively operate one of the drive switches so that one of the first and second write currents flows between the current mirror and the voltage source past a respective end of the coil and the other of the first and second write currents flows between the current mirror and the voltage source through the coil in a selected direction.

15. The write driver circuit of claim 14, including an overshoot reduction circuit for reducing write current overshoot through the coil comprising:

an active subcircuit generating a compensation signal based on a voltage across the magnetic head that exceeds a predetermined threshold; and means coupled to the current mirror and responsive to the active subcircuit to adjust the first and second write currents based on the compensation signal.

16. The write driver circuit of claim 15, wherein the active subcircuit of the overshoot reduction circuit comprises:

first and second complementary transistors each having a control region coupled to the first end of the magnetic head;

third and fourth complementary transistors each having a control region coupled to the second end of the magnetic head; and a resistor having a first side connected to the first and third transistors and having a second side connected to the second and fourth transistors.

17. The write driver circuit of claim 14, wherein the forward drive switch comprises a first transistor having a control region coupled to the control circuitry, a collector for coupling to the first side of the magnetic head, and an emitter connected to the source for supplying the reference potential, and wherein the reverse switch comprises a second transistor having a control region coupled to the control circuitry, a collector for coupling to the second side of the magnetic head, and an emitter connected to the source for supplying the reference potential.

18. The write driver circuit of claim 14, wherein the control circuitry comprises:

a pre-driver current source having first and second sides, the first side being coupled to a predetermined potential;

first and second control inputs;

a first control transistor having a control region coupled to the first control input, a collector coupled to the control region of the first transistor, and an emitter coupled to the second side of the pre-driver current source;

a second control transistor having a control region coupled to the second control input, a collector coupled to the control region of the second transistor, and an emitter coupled to the second side of the pre-driver current source;

a first resistor coupled between the collector of the first control transistor and a ground potential; and a second resistor coupled between the collector of the second control transistor and the ground potential.

\* \* \* \* \*

UNITED STATES PATENT AND TRADEMARK OFFICE
CERTIFICATE OF CORRECTION

PATENT NO. : 6,215,607 B1
DATED : April 10, 2001
INVENTOR(S) : Tuan V. Ngo

It is certified that error appears in the above-identified patent and that said Letters Patent is hereby corrected as shown below:

Column 3,
Line 50, delete "inequitably", insert -- inevitably --

Column 8,
Line 40, delete "A,", insert -- A --
Line 47, delete "For", insert -- for --
Line 48, delete "sinking,", insert -- sinking --

Signed and Sealed this

Nineteenth Day of March, 2002

Attest:

JAMES E. ROGAN
Director of the United States Patent and Trademark Office

Attesting Officer